Feb. 23, 1937.  J. M. LUCARELLE  2,072,055
CORRECTION DEVICE FOR DICTATION MACHINES
Filed Aug. 5, 1930  2 Sheets-Sheet 1

INVENTOR
Joseph M. Lucarelle
BY
ATTORNEYS

Feb. 23, 1937. J. M. LUCARELLE 2,072,055
CORRECTION DEVICE FOR DICTATION MACHINES
Filed Aug. 5, 1930 2 Sheets-Sheet 2
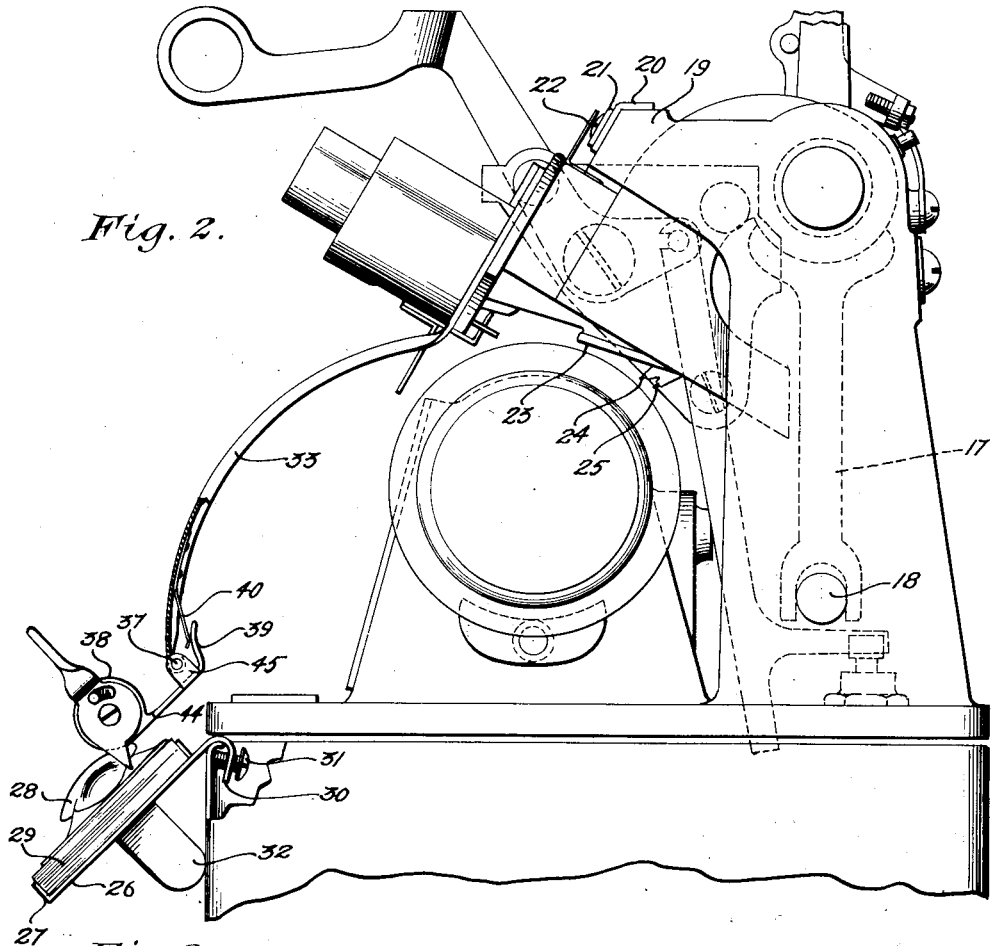
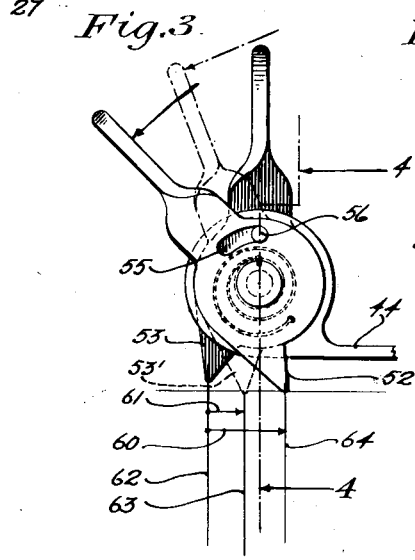
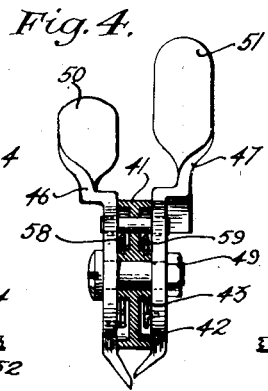
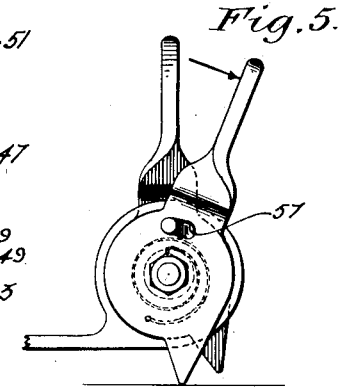
INVENTOR
Joseph M. Lucarelle,
BY
ATTORNEYS Patented Feb. 23, 1937

2,072,055

UNITED STATES PATENT OFFICE 2,072,055

CORRECTION DEVICE FOR DICTATION MACHINES

Joseph M. Lucarelle, Bridgeport, Conn., assignor to Dictaphone Corporation, New York, N. Y., a corporation of New York Application August 5, 1930, Serial No. 473,275

2 Claims. (Cl. 234—1)

This invention relates to correction devices for phonographs; and particularly to that type of phonograph which is adapted to commercial use, in which is employed a recorder for recording dictation and a reproducer for reproducing dictation. In connection with phonographs of this character it has been usual to employ memorandum sheets, each sheet having printed thereon a scale corresponding to a scale on the phonograph, upon which sheet the dictator may note certain instructions and corrections, this memorandum sheet being turned over to the transcriber as a guide in transcribing the record. Devices for this purpose heretofore proposed have consisted of various forms.

According to one form, a pointer moves near or over a correction sheet so as to indicate to the dictator where on such sheet a mark may be made by hand, and in some instances the pointer has been modified to furnish a straight edge or guide along which the pencil may be moved by the dictator to mark on the correction sheet the desired indication.

According to another form, a plurality of recording devices are provided for mechanically indicating different instructions at points predeterminedly placed in position in a direction transversely of the correction sheet, so as to indicate transversely of such sheet a plurality of different instructions.

Such devices have not proved wholly satisfactory for several reasons, namely, with respect to pointer or guide devices, that they require in their operation on the part of the dictator considerable concentration and effort in order that the indication mark be correctly positioned, and with respect to the mechanically operated plural arrangement of marking means, that they are cumbersome, take up more space on the machine than can usually be spared, and necessitate on the part of the operator considerable mental effort to insure the operation of the proper marker.

It is an object of the present invention to provide a simple and inexpensive correction-indicating device adapted to avoid the defects of the types of devices above described. Another object is to provide a device of the nature described which may be readily mounted in operative relation to a well known type of dictating machine. Another object is to provide indication means of the character described adapted to indicate different instructions by marks of different lengths extending transversely of the sheet. Another object is to provide a correction sheet marker comprising a plurality of marking instrumentalities which may be easily operated and without mental effort on the part of the operator. Other objects will be in part obvious and in part pointed out hereinafter.

The invention accordingly consists in the features of construction, combination of elements, and arrangements of parts as will be exemplified in the structure to be hereinafter described and the scope of the application of which will be indicated in the following claims.

In the accompanying drawings in which is shown one of the various possible embodiments of the invention.

Fig. 2 is a side elevation thereof with parts broken away and other parts shown in cross section;

Fig. 3 is a side elevation of the marking device taken from the same side as Fig. 2 but with one of the markers moved to its extreme operated limit and with the extreme operated limit of the other marker indicated by broken lines.

Fig. 4 is a part elevation and part cross section taken substantially on line 4—4 of Fig. 3 and showing the markers in the same relative position as in Fig. 3.

Fig. 5 is a side elevation taken from the side of the marking device opposite to the position from which Fig. 3 is shown.

Similar reference characters refer to similar parts throughout the various views of the drawings.

Figure 1:
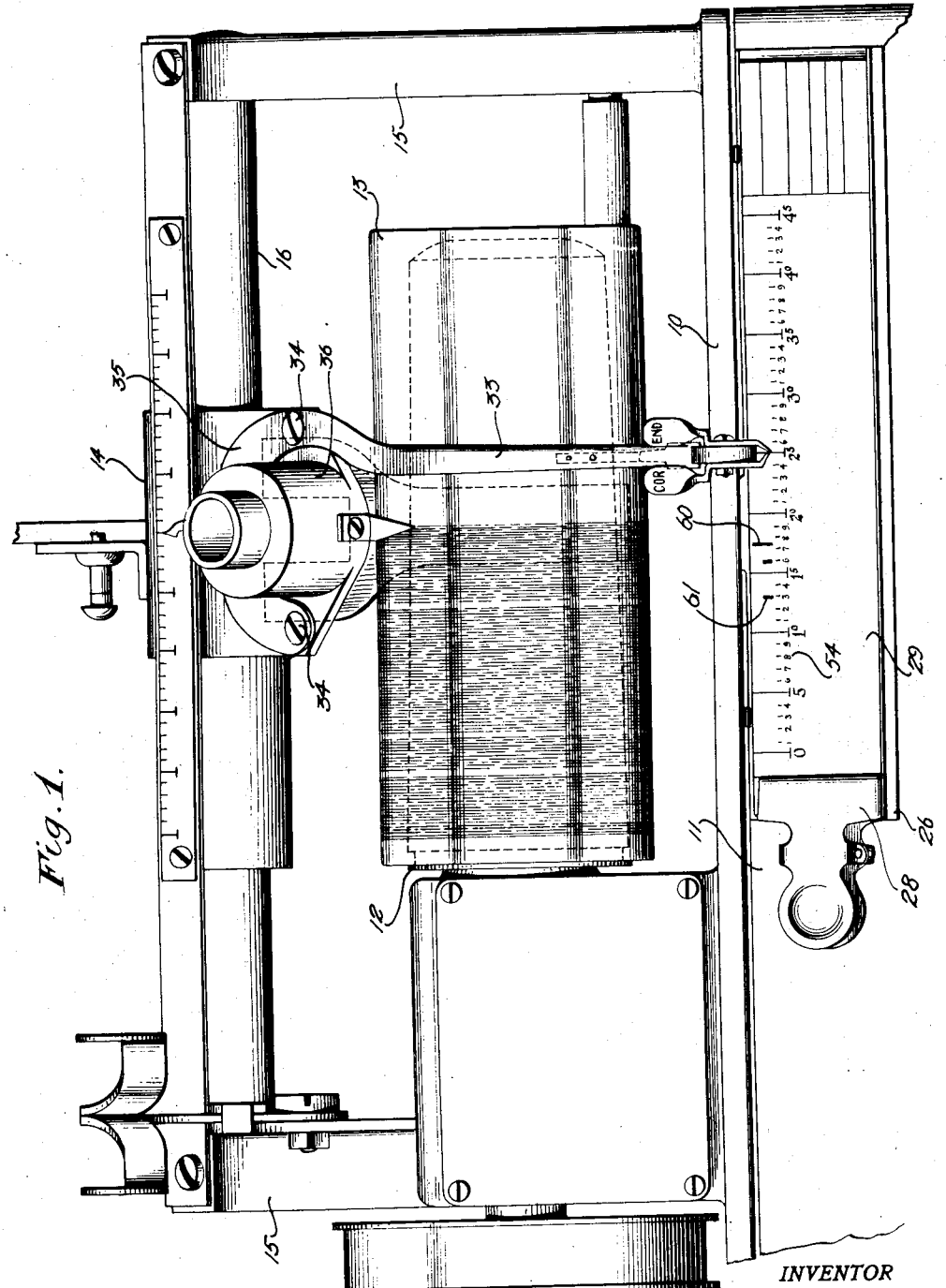
Fig. 1 is a front elevation of the upper part of a dictating machine with a marking device made in accordance with the present invention applied thereto.

In general, the indication marking device comprises a support for memorandum sheets, an indicator, and means whereby the indicator and support have relative movement in proportion to the relative movement of the sound-box and record tablet, said indicator comprising a plurality of marking devices adapted alternatively to be operated by the dictator to make either a long or a short mark extending transversely of the record sheet to indicate different instructions or suggestions, as, for example, the long mark may be employed to mean the beginning and ending of a letter while the short mark may be used to indicate that a correction has been made in dictating. The correction device is preferably so mounted with respect to the pad of memorandum sheets, each sheet of which has a scale extending longitudinally thereof, that each marker will make its mark above the scale, each mark beginning the same distance down from the top edge of the sheet and extending upwardly toward the top edge of the sheet a short distance, or a relatively long distance, depending upon which marker is used.

Only so much of the dictating machine is shown as will serve to make clear the application of the invention thereto. The base 10 of the machine is supported on a motor box 11 containing mechanism (not shown) for imparting rotation to the mandrel 12 on which the record tablet 13 is mounted, and for moving the sound-box carriage 14 longitudinally thereover. Arising from the base 10 at either end thereof are a pair of standards 15, extending between which is a hollow carriage guide-rod or tube 16 along which the carriage is movable. This tube is adapted to contain a feed-screw (not shown) for imparting movement to the carriage axially of the record tablet. The carriage is prevented from rotating on said guide-rod by means of a depending arm 17 which is forked at its lower end to straddle a guide-rod 18 extending between said standards.

Extending forwardly from each standard 15 at the top thereof is an arm 19 for supporting a bar 20, to the face of which is attached a scale member 21. Along the scale 21 a pointer 22 is adapted to move as the carriage travels. The carriage supports a suitable sound-box 23 provided with recording and reproducing styli 24 and 25 adapted to trace or track a sound line on the surface of the record tablet.

As best shown in Figures 1 and 2, a support is provided for a pad composed of superimposed memoranda or correction sheets, and preferably this support comprises a tray 26, provided with a longitudinal positioning flange 27 and clamping means 28, said tray being of a size suitable to receive a pad of correction sheets, as indicated at 29. The pad is placed on the tray with its lower edge against the flange 27 and is held in place by the clamp 28. The tray is further provided with a hook 30 adapted to be received between the base of the machine and the motor casing 11, and to extend downwardly below the upper edge of said casing. A screw 31 may be provided to engage the inner side of the motor casing to hold the tray in any desired position longitudinally of the machine. The support of the tray is preferably such that said tray is inclined to the horizontal in order that the correction sheets may be in a plane substantially at right angles to the line of sight. In the form shown, said tray is also provided with a plurality of lugs 32 designed to engage the surface of the cabinet to prevent the tray from tilting downwardly out of its proper position.

An indication marker is provided to have movement over the correction sheet or sheets supported on the tray 26, such movement being in proportion to the travel of the sound-box over the record tablet. In the form shown, said indication marker comprises an arm or bracket 33 secured to the front of the carriage by means of screws 34, said arm being curved at 35 to embrace the forward projection 36 of the carriage, and extends downwardly toward the tray 26. At its lower end the bracket 33 is provided with means for seating a horizontally disposed pivot pin 37, by means of which a mechanical marking device, indicated generally by the number 38, is pivotally mounted so as to be movable in an up-and-down manner about its axis 37 toward and away from the face of the correction sheet pad. Normally the marking device 38 is held with its individual markers out of contact with the pad by reason of the engagement of a rearward extension 39 engaging a spring 40 secured upon the underside of the bracket 33, all as clearly shown in Fig. 2.

The device 38 comprises a short cylindrical flange 41 connected by means of a web 42 to an equally short hub 43. Extending rearwardly and upwardly from the flange 41 and substantially tangentially therewith, as shown in Fig. 2, is a supporting arm 44 provided with upstanding ears 45 by means of which the marking device is pivotally mounted, as described above, by means of the pin 37 to the bracket 33. The rearward projection or extension 39 hereinbefore mentioned is in fact a continuation of this arm 44. A pair of long and short stroke markers 46 and 47 are mounted concentrically with respect to the hub 43 for rotative movement relatively to the hub by means of a bolt 48 upon which is threaded a nut 49. Each of the markers is movable independently of the other and they are provided with fingerpieces 50 and 51 by means of which they may be depressed or turned about the bolt 48 by the operator when he desires to make an indication upon the correction sheet.

Each of the markers is provided with a downwardly projecting marking point, respectively 52 and 53, either of which or, in fact, both of which may be brought into contact with the face of the pad by swinging the whole device downwardly about its pivot 37 by pressing on the fingerpieces. After contact with the pad further movement of either of the fingerpieces causes its respective marker 52 or 53 to move rearwardly in contact with the top sheet of the pad making a straight line thereon, which line extends upwardly and transversely of the pad from a point just above the scale 54, shown in Fig. 1 as extending lengthwise of the sheet. The long stroke marker 46 has formed in the disklike center portion thereof a slot 55 adapted to co-act with a pin 56, rigidly secured in the web 42 of the correction device, to limit the movement of the long stroke marker about the pivot bolt 48 in both directions. This slot is of a length to provide for an angular movement of the marker of substantially 45° from its normal position of rest. The short stroke marker or lever 47 is similarly provided with a slot 57 of such a length as to permit angular movement of said marker through an angle of substantially 22½°.

Normally, both markers stand in the same relative position with respect to the supporting member 41. This position is shown in Fig. 2 of the drawings. It will be seen that as looked at from the side, both fingerpieces are in alignment and both marking points are in alignment and that both marking points are raised slightly from the surface of the correction pad. If it is desired to operate but one of the marking devices, say the long one, its fingerpiece 50 is depressed, bringing the marking point 52 in contact with the paper.

As now the marking lever 46 swings about its pivot, its marking point, moving rearwardly or upwardly with reference to the surface of the pad toward the upper edge thereof, will gradually approach a point where it will coincide with a diameter or axis of the marking device which is perpendicular to the face of the pad. It will be clear that as this movement takes place the marking device as a whole will be swung upwardly about its pivot pin 37 so that the marker which is not being used or operated will be lifted clear of the record sheet by the marker which is being operated.

Upon either side of the web 42 of the flange or disk 41 are coil springs, respectively 58 and 59. The spring 58 has one end secured to the marking lever or member 46 and its other end secured to the web 43. The other spring 59 has one end attached to the marking lever 47 and its other end to the hub 43. These springs normally tend to hold the marking levers in their condition of rest or alignment, as seen in Fig. 2, but upon operation of either, after release by the dictator, the lever will be returned to its normal position by means of its spring 58 or 59, as the case may be.

Fig. 3 shows clearly, as at 60 and 61, a diagrammatic representation of a long mark and a short mark, indicating how both marks have their origin in a starting line which may or may not be produced upon the pad sheet, and how each mark terminates when the marker making it reaches the end of its angular swing. In Fig. 3, 62 indicates the starting line of the marks, 63 the finish line of the short marker, and 64 the finish line of the long marker. Also in Fig. 3, the normal position of both markers is the same as the position 53 which the short mark occupies. The operated position of the long stroke marker is shown as at 52 and the operated position of the short stroke marker is shown in dotted lines, as at 53'.

The marking points 52 and 53 are composed of some metal or alloy adapted to produce a mark upon a sheet of paper when drawn across its surface. In order, however, that the softer alloys need not be employed, a correction sheet is used the surface of which has been treated chemically in such a manner as to receive a substantially black mark, resembling a pencil mark, even when the markers are composed of relatively hard metals or metallic alloys, such as brass or silver.

By locating the two different kinds of marks, that is, short marks and long marks, in the space above the scale as indicated by the numerals 60 and 61 in Fig. 1, the marks are in a convenient position immediately to engage the eye of the transcriber as the pointer on her machine travels over the correction sheet; and in this position further has the advantage of not appropriating any of the large lower part of the correction sheet surface, which may be used for pencil notes or other indicia. The present device, consisting as it does of two aligned pivotally mounted levers, may be of light construction so as not to be clumsy and in the way of the operator and further, may be operated much more easily and surely than marking devices employing a plurality of keys. It will therefore be seen that the present invention is one well adapted to carry out the objects hereinbefore set forth in a thoroughly practical manner.

As many possible embodiments may be made of the above invention without departing from the scope thereof, it is to be understood that all matter herein set forth or shown in the accompanying drawings is to be interpreted as illustrative and not in a limiting sense.

I claim:

1. In a correction device for dictating machines, the combination of a correction sheet having a surface exposed to receive markings, a bracket having its free end movable along a path parallel to said sheet, an arm pivoted on the bracket at its said free end for movements toward and away from said sheet, a marker mounted to be moved with said arm toward and away from said sheet, means for moving said marker relatively to said arm to make a mark on the sheet, and means for yieldingly retaining said arm in position with the said marker normally held away from said sheet.

2. In a correction device for dictating machines, the combination of a correction sheet having a surface exposed to receive markings, a bracket having its free end movable along a path parallel to said sheet, an arm pivoted on the bracket at its said free end for movements to operative and inoperative positions relatively to said sheet, a marker pivotally mounted on said arm for rotation in relation thereto, means normally operative for holding said arm yieldingly in its inoperative position, and means including a fingerpiece connected to said marker to manually rotate said marker when said arm is in its operative position thereby to make a mark upon the correction sheet.

JOSEPH M. LUCARELLE.